Sept. 28, 1926.  E. C. ANDERSON  1,601,424
ANIMAL TRAP
Filed April 14, 1926
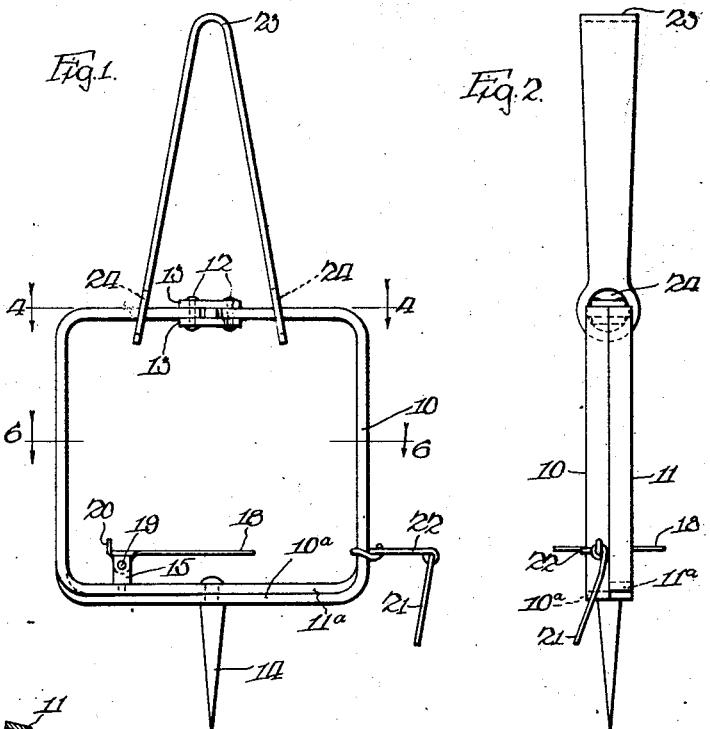
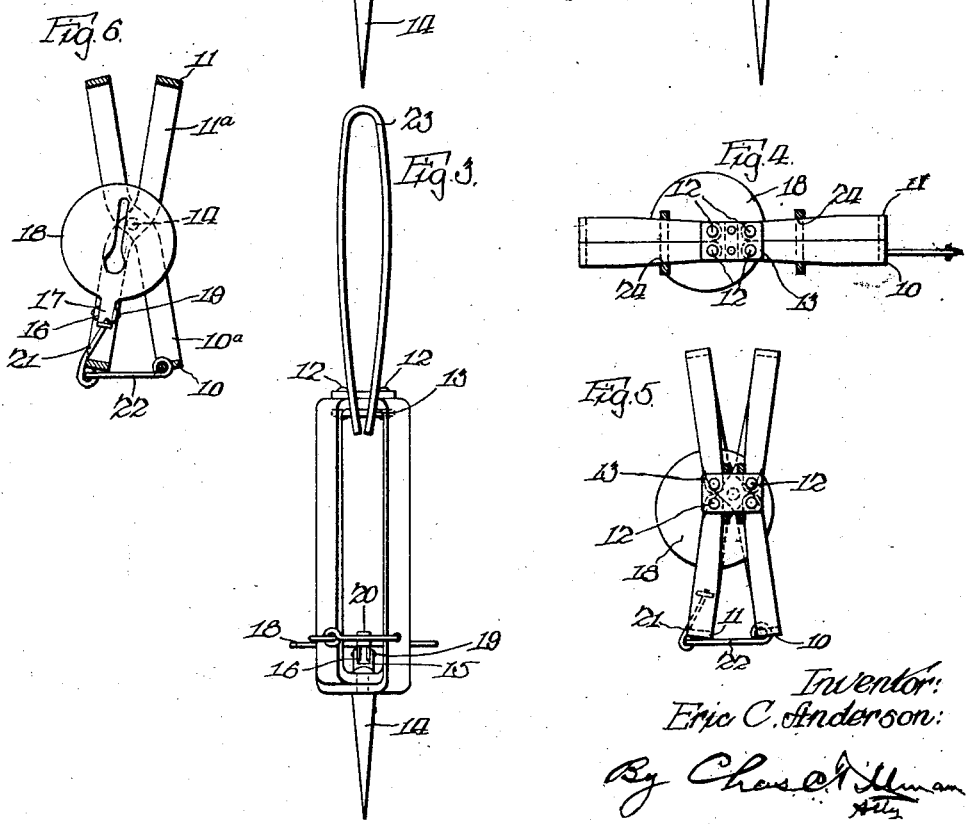
Inventor:
Eric C. Anderson
By Chas. A. Ullman
Atty Patented Sept. 28, 1926.

1,601,424

UNITED STATES PATENT OFFICE.

ERIC C. ANDERSON, OF GLEN FLORA, WISCONSIN.

ANIMAL TRAP.

Application filed April 14, 1926. Serial No. 101,928.

This invention relates to improvements in that class of traps used for catching animals, which are ordinarily known as "jaw" traps, that is the jaws are actuated by means of a spring so as to hold them firmly in their closed or thrown positions, and it consists in certain peculiarities of the construction, novel arrangement and combination of the various parts thereof, as will be hereinafter more fully set forth and specifically claimed.

The principal object of my invention is, to provide a highly efficient trap for catching various kinds of animals, which shall be simple and inexpensive in construction, strong durable and so made, that it may be suspended when set, or if desired, it may be fixed to the ground, or supporting surface, in such a way as not to interfere with the operation of the jaws.

A further object of the invention is, to provide a trap which when set will occupy a vertical plane instead of a horizontal one as usual, and will be so constructed as to expose the bait pan laterally instead of vertically and in such a way that an animal may approach the bait pan of the trap from either side thereof.

A still further object is to furnish a trap having two pairs of pivotally connected and oppositely opposed jaws actuated by a single spring, which will be so disposed when the trap is set as to support the same, if desired, in a suspended position and without bearing vertically upon the jaws, but being ever ready to actuate the same when the pan is tripped.

Another object is to provide a trap in which the animal caught thereby, may be instantly killed, thus saving it from self-mutilation and preventing pain and suffering.

Other objects and advantages of the invention will be disclosed in the subjoined description, and explanation, which will be more readily understood when read in conjunction with the accompanying drawing, which illustrates an embodiment of which the invention is susceptible, it being understood that changes and modifications may be resorted to, without a departure from the spirit of the invention, so long as they fall within the scope of the appended claim.

In the drawing:—

Fig. 1, is a face view in elevation of the trap in its open or unset position.

Fig. 2, is a side view thereof.

Fig. 3, is a side view in elevation, showing the parts of the trap in their set or operative position.

Fig. 4, is a view partly in section and partly in elevation taken on line 4—4, of Fig. 1, looking in the direction indicated by the arrows, showing the parts in their open or unset positions.

Fig. 5, is a view on the same line, but showing the parts in a different position and, Fig. 6, is a horizontal sectional view taken on line 6—6, of Fig. 1, looking in the direction indicated by the arrows, showing the parts in their operative position.

Corresponding numerals of reference refer to like parts throughout the different views of the drawing.

Referring now to the drawing, it will be seen and understood, that the trap comprises two broken substantially rectangular jaws of strong material of a suitable kind, located throughout the majority of their portions, side by side or edge-wise with respect to one another. These jaws are indicated by the numerals 10, and 11, and as shown particularly in Figs. 1, 4, and 5, of the drawing, have their upper portions slightly separated from one another and secured by means of pivot pins 12, between two plates 13, for pivotal movement. The jaw 11, is somewhat smaller than the jaw 10, so as to afford a lower portion 11$^a$, thereof, which lies above the lower portion 10$^a$, of the jaw 10, it being understood as shown in Figs. 5, and 6, that the lower portions 10$^a$, and 11$^a$, of each of the jaws is off-set at its middle portion to cross one another at said point where they are pivotally secured one on the other by means of a pivot or spike 14, adapted, if desired to pierce the ground or the supporting surface, so as to hold the bottom portions at a slight distance from said support to enable them to turn on the said pivot or spike. The bottom portion 11$^a$, is provided with an upright projection 15, near one of its side walls which may be riveted or firmly secured in said portion by any desired means. The upper end of this post or projection 15, is vertically slotted as at 16, see Figs. 3, and 6, to provide space for a tongue or projection 17, located on the bait pan 18, and extended therefrom, between the side walls of the open vertical slot 16, where the tongue may be pivotally secured by means of a transverse pin 19, or pivot for the pan. The free end of the tongue is up-turned as at 20, see Figs. 1, and 3, which up-turned portion is provided with an eye or opening to receive one end of a trigger 21, which is loosely connected to one end of a trigger bar 22, the other end of which is loosely connected to one of the side walls of the jaw 10, near its bottom.

It will be observed, especially in Figs. 4, and 5, of the drawing, that the upper horizontal portion of each of the jaws 10, and 11, is inwardly inclined from its side walls to the portions pivotally connected between the plates 13, which are superimposed one above the other, for the purpose of permitting the broken ends of the jaws operating therebetween.

Mounted on the upper horizontal portion of the jaws 10, and 11, is an actuating bow or bent spring 23, the lower ends of which are provided with openings 24, or eyes which are of sufficient size to snugly encompass the plates 13, and to freely slide under its tension on the inclined portions of the jaws in the operation of the trap being thrown, when by reason of the rings or eyes 24, the said jaws will be firmly held in their thrown position.

The operation of the trap is simple and as follows. Assuming that the parts are in the positions shown in Fig. 1, of the drawing, and it is desired to set the trap, it is only necessary to press the spring to about the position shown in Fig. 3, of the drawing, when it is evident that the jaws may be turned on their pivots 12, and 14, until they approximate each other in the opposite direction from that shown in Fig. 1, of the drawing, when it will be understood that the side wall of the bar 10, which carries the trigger bar will be located adjacent the side wall of the bar 11, adjacent the up-turned end 20, of the bait pan 18, which it will be understood as previously has been provided with bait of a suitable kind. When the parts are in the position above described, the trigger bar 22, extended across the bar 11, or rather its side wall close to the up-turned portion 20, of the bait pan, when it is obvious the trigger 21, may be inserted at its free end in the opening of the part 20, thus counterbalancing the weight of the bait and its pan and securely holding the jaws in their set positions.

Thus it will be understood that the baited pan will be exposed on opposite sides for access thereto by an animal, and that upon it slightly depressing the bait, the trigger 21, will be released and by reason of the tension of the spring the jaws will be quickly thrown to the positions shown in Fig. 1, and there firmly held.

It will be understood, that when the trap is set and the parts occupy the positions shown in Fig. 3, of the drawing, the spring 23, will embrace the connecting plates 13, only, for the upper horizontal portions of the jaws, thus relieving the same of any bearing pressure of the spring, but that as soon as the jaws are released by the trap and trigger, the spring will be permitted to throw the side walls of the jaws into juxtaposition or contact with one another with great force, on account of the inclined edges of the upper horizontal portion of the frames, which will permit the arms of the spring to slide far enough on the horizontal portions of the jaws to exert great leverage thereon.

By my improvements, it is manifest, that a chain, or cable can be attached to the upper portion of the spring, so that the trap may be suspended at a suitable distance above the ground or supporting surface, or it can be suspended so as to occupy a position above a body of water, or it can be submerged in the water so as to hang at a distance from the bottom of the water or as may be desired. The spike in the bottom of the crossed pieces of the jaws, serves not only as a pivot, but also to act as a support for the trap in such a way that the lower portion of the jaws will not be interfered with, by the supporting surface.

Having thus fully described my invention, what I claim as new, and desire to secure by Letters Patent is:—

In an animal trap of the class described, the combination with a pair of broken upright rectangular frame-like jaws located edge to edge and one of said jaws being smaller than the other jaw, said jaws crossing each other at their lower horizontal portions, a pivot connecting them together at said portions and depending therefrom, the ends of each jaw pivotally united to a connecting member, of said connecting member, an expanding bow spring slidably engaging the upper horizontal portions of said jaws, the same tapered toward their connections with said member, and means on the lower portions of the jaws for trippingly holding them in set positions.

ERIC C. ANDERSON.